(12) United States Patent
Pearlstein et al.

(10) Patent No.: US 8,566,382 B2
(45) Date of Patent: Oct. 22, 2013

(54) METHOD AND APPARATUS FOR IMPROVED CALCULATION OF MULTIPLE DIMENSION FAST FOURIER TRANSFORMS

(75) Inventors: Larry Pearlstein, Newtown, PA (US); Richard K. Sita, Audubon, NJ (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1065 days.

(21) Appl. No.: 12/555,122

(22) Filed: Sep. 8, 2009

(65) Prior Publication Data

US 2010/0077176 A1 Mar. 25, 2010

Related U.S. Application Data

(60) Provisional application No. 61/099,073, filed on Sep. 22, 2008.

(51) Int. Cl.
*G06F 17/15* (2006.01)
*G06F 17/00* (2006.01)

(52) U.S. Cl.
USPC ............................ 708/424; 708/209; 708/403

(58) Field of Classification Search
None
See application file for complete search history.

(56) References Cited

U.S. PATENT DOCUMENTS

| 7,434,024 B2 | 10/2008 | Selvaggi et al. | |
| 2003/0142873 A1* | 7/2003 | Lafruit et al. | 382/240 |
| 2006/0218341 A1* | 9/2006 | Nolte et al. | 711/109 |

OTHER PUBLICATIONS

Hennessy et al., "Computer Architecture: A Quantitative Approach", 3$^{rd}$ Edition, ISBN: 1558605967 (Morgan Kaufmann, 2003).

* cited by examiner

*Primary Examiner* — Scott Sun
(74) *Attorney, Agent, or Firm* — Volpe and Koenig, P.C.

(57) ABSTRACT

Apparatus and methods for storing data in a block to provide improved accessibility of the stored data in two or more dimensions. The data is loaded into memory macros constituting a row of the block such that sequential values in the data are loaded into sequential memory macros. The data loaded in the row is circularly shifted a predetermined number of columns relative to the preceding row. The circularly shifted row of data is stored, and the process is repeated until a predetermined number of rows of data are stored. A two dimensional (2D) data block is thereby formed. Each memory macro is a predetermined number of bits wide and each column is one memory macro wide.

13 Claims, 5 Drawing Sheets

FIG. 2

16 x 4 MATRIX TRANSPOSE (1 COL)

8 x 16 MATRIX TRANSPOSE (1 COL)

200

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 16 | 17 | 32 | 48 | 20 | 36 | 52 | 8 | 24 | 40 | 56 | 12 | 28 | 44 | 60 |
| 31 | 32 | 33 | 34 | 35 | 36 | 37 | 38 | 39 | 40 | 41 | 42 | 43 | 44 | 45 |

{ 202 }

{ 204 }

METHOD AND APPARATUS FOR IMPROVED CALCULATION OF MULTIPLE DIMENSION FAST FOURIER TRANSFORMS

CROSS REFERENCE TO RELATED APPLICATION(S)

This application claims the benefit of U.S. Provisional Patent Application No. 61/099,073, filed on Sep. 22, 2008, which is incorporated by reference as if fully set forth.

FIELD OF INVENTION

The present invention is related to methods and apparatus of storing data in blocks with improved accessibility along multiple dimensions, as well as single instruction multiple data (SIMD) processors configured to improve the calculation speed of multiple dimension fast Fourier transforms (FFTs).

BACKGROUND

A fast Fourier transform (FFT) is an efficient algorithm to compute the discrete Fourier transform (DFT) and its inverse. There are many distinct FFT algorithms involving a wide range of mathematics, from simple complex-number arithmetic to group theory and number theory.

A DFT decomposes a sequence of values into components of different frequencies. It is defined by the formula:

$$X_k = \sum_{n=0}^{N-1} x_n e^{-i2\pi k \frac{n}{N}} \quad k = 0, 1, \ldots, N-1 \qquad \text{Equation 1}$$

This operation is useful in many fields, but computing it directly from the definition is often too slow to be practical. An FFT is a way to compute the same result more quickly. The difference in speed can be substantial, especially for long data sets where N may be in the thousands or millions—in practice, the computation time can be reduced by several orders of magnitude in such cases, and the improvement is roughly proportional to N/log(N). This huge improvement made many DFT-based algorithms practical; FFTs are of great importance to a wide variety of applications, from digital signal processing and solving partial differential equations to algorithms for quick multiplication of large integers.

However, the calculation of multi-dimensional FFTs may still pose a number of difficulties. One such difficulty is the efficient access of the data in various dimensions. An efficient means of storing and accessing data representing multiple dimensional arrays of values, for example two dimensional (2D) data from digital images, or three dimensional (3D) data from a series of digital images making up a video stream is desirable to quickly calculate FFTs within such data along multiple dimensions and/or axes.

Further, in many cases, such as phase plane correlation (PPC) of video images, it may be desirable to perform compound functions on the data, possibly over multiple dimensions. For example, in PPC it is desirable to be able to rapidly perform complex multiplication of data from sequential images, followed by FFTs over all of the rows and columns of the images.

SIMD processors are well suited to performing the same operation on multiple elements of data simultaneously. Typically, parallel processing portions of a single arithmetic logic unit (often viewed as individual parallel ALUs) may operate on portions of operands simultaneously.

SIMD architecture is generally well known, and described in John L. Hennessy, David A. Patterson, David Goldberg, Computer Architecture: A Quantitative Approach (Morgan Kaufmann, 2003)—ISBN: 1558605967, the contents of which are hereby incorporated herein by reference.

Specialized SIMD processors are particularly well suited for operating on data representing video. Processing of video, in turn, requires numerous specialized calculations.

Known media processors and digital signal processors typically require multiple processor clock cycles to perform separate instructions such as complex multiplication and FFTs. Further, the access of data in multiple dimensions stored in standard random access memory schemes may take additional clock cycles.

A memory storage method capable of more efficiently accessing multi-dimensional data across various axes and a processor capable of efficiently determining complex multiplication and FFT functions within such multi-dimensional data sets would be desirable.

SUMMARY

An example embodiment of the present invention is a method for storing data in a block to provide improved accessibility of the stored data in two or more dimensions. The data is loaded into memory macros constituting a row of the block such that sequential values in the data are loaded into sequential memory macros. The data loaded in the row is circularly shifted a predetermined number of columns relative to the preceding row. The circularly shifted row of data is stored, and the process is repeated until a predetermined number of rows of data are stored. A two dimensional (2D) data block is thereby formed. Each memory macro is a predetermined number of bits wide and each column is one memory macro wide.

Another example embodiment of the present invention is a memory storage device for storing data in a block to provide improved accessibility of the stored data in two or more dimensions. The memory storage device includes: an input buffer; a barrel shifter coupled to the input buffer; and storage elements coupled to the barrel shifter. The input buffer includes a number of memory macros constituting a row of the block. The input buffer arranged such that sequential values in the data are loaded into sequential memory macros. The barrel shifter circularly shifts the data stored in the input buffer a predetermined number of columns relative to the preceding row of data. The storage elements store the circularly shifted rows of data from the input buffer. Each memory macro is a predetermined number of bits wide and each storage element corresponds to one of the columns of the block.

A further example embodiment of the present invention is a method of processing a single processor readable instruction in a single instruction multiple data (SIMD) processor. In response to the single processor readable instruction: N pairs of two's complement complex numbers are multiplied, where N is an integer greater than three; the N products of this multiplication are separated into (N/M) groups of M products, where M is an integer greater than one and (N/M) is an integer; and an M-point fast Fourier transform (FFT) is computed for each group of M products.

An additional example embodiment of the present invention is a SIMD processor including an arithmetic logic unit (ALU) for receiving N pairs of two's complement complex numbers from data storage, where N is an integer greater than three. The ALU includes: N multipliers, for multiplying the N pairs of two's complement complex numbers in response to a single processor executable instruction; a register coupled to the N multipliers to store the N products of the N multipliers; and a fast Fourier transform (FFT) engine coupled to the register to perform an FFT on the N products stored in the register in response to the single processor executable instruction.

BRIEF DESCRIPTION OF THE DRAWING(S)

A more detailed understanding may be had from the following description, given by way of example in conjunction with the accompanying drawings wherein:

FIG. 2 is a schematic diagram illustrating storage of a sequential data in a two dimensional data block, using the example method of FIG. 1;

DETAILED DESCRIPTION

Example embodiments of the present invention include systems and methods for storing data in a block to provide improved accessibility of the stored data in two or more dimensions, as well as systems and methods for processing a single processor readable instruction in a single instruction multiple data (SIMD) processor to perform complex multiplication and fast Fourier transformations (FFTs) of pairs of series of data.

Figure 1:
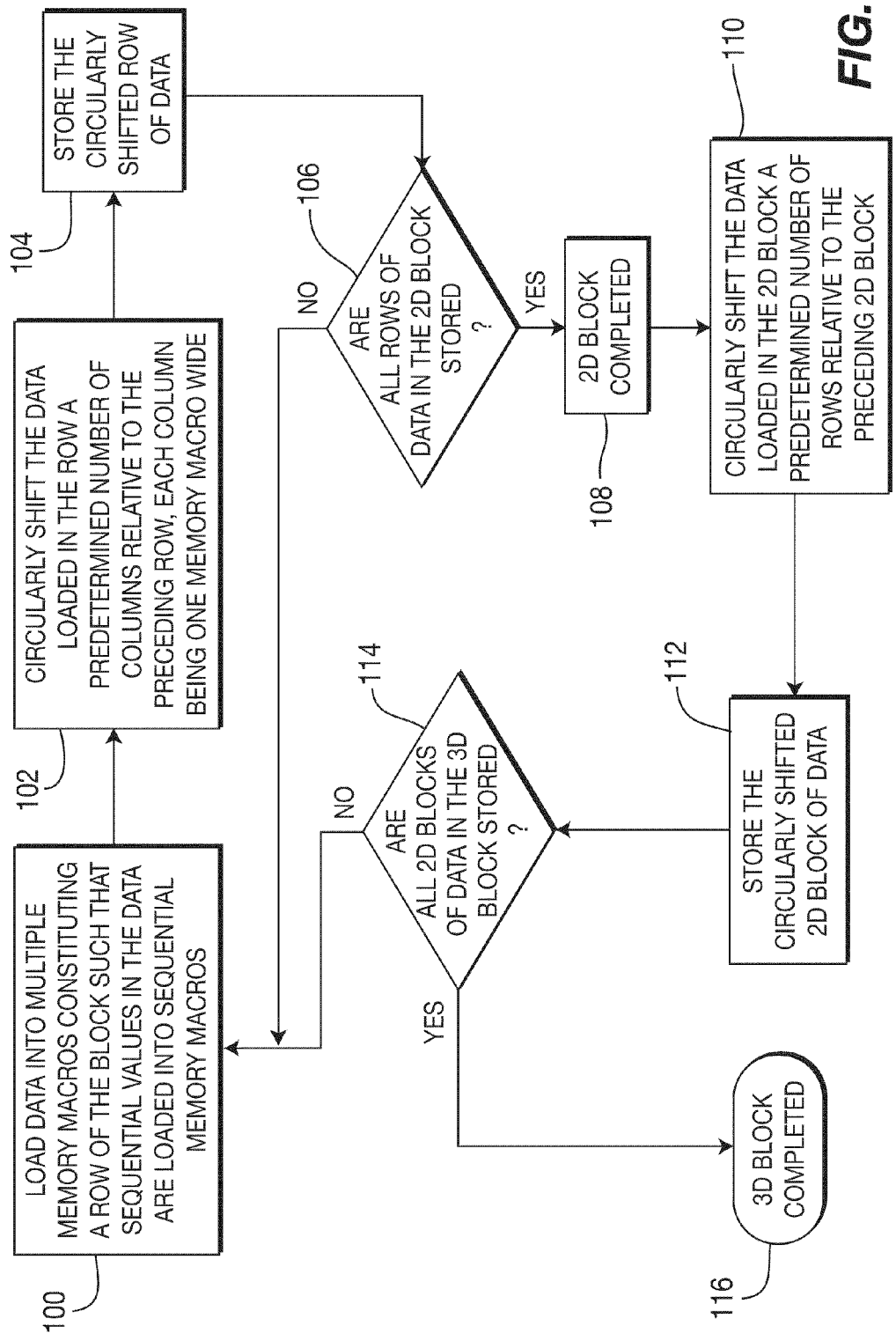
FIG. 1 is a flow diagram illustrating an example method for storing data in a block to provide improved accessibility of the stored data in two or more dimensions.

FIG. 1 is a flow diagram illustrating an example method for storing data in a block to provide improved accessibility of the stored data in two or more dimensions. This example method allows multi-dimensional data to be stored in a configuration such that it may be efficiently accessed along various axes in a single clock cycle. It should be noted that, although many of the following examples are focused on storing two dimensional (2D) data sets for the simplified access of rows and columns of data, one skilled in the art should understand that these methods may be extended to three or more dimensions, and/or used to efficiently access axes other than rows and columns of the data, (such as, e.g., wrapped diagonals of the data or axes of partial transposes of the data).

The data is loaded into a plurality of memory macros constituting a row of the block, step 100. The data is desirably loaded such that sequential values in the data are loaded into sequential memory macros of the input buffer. Each of these memory macros is a predetermined number of bits wide, i.e. the number of bits of the data to be stored. The memory macros are arranged to operate in parallel, so that each row of data in the block is desirably loaded during a single clock cycle.

In many typical applications, each row of data to be stored in the block may consist of a power of two values, (i.e. the block of data consists of 2^N columns, where N is a positive integer). Thus, it may be desirable for the data storage system to be designed such that each row of data stored in the block constitutes a power of two memory macros, for example, 64 memory macros or 16 memory macros, as illustrated in the example schematic diagram of FIG. 2. It should be noted, however, that if the data includes fewer values (i.e. columns) than the number of memory macros in the row, then the 'extra' memory macros may go unused.

Each of the memory macros is desirably sufficiently wide to accommodate all of the bits of precision of the values that make up the data. For example, if each value of the data to be stored in a block using the example method is a complex s16 value (i.e. both the real and imaginary parts of the value are stored as signed 16 bit numbers), then it is desirable for each memory macro to be 32 bits wide. Typically, the values of the data are 2^N bits wide, where N is a positive integer. Thus, it is desirable for each memory macro to be a power of two bits wide.

The data loaded in the row is circularly shifted a predetermined number of columns relative to a preceding row (as noted above each column being one memory macro wide), step 102, and then the circularly shifted row of data is stored, step 104. Next, it is determined if all of the rows of data in the 2D block of data have been stored, step 106. If all of the rows have been stored, then the 2D data block is completed, step 108, otherwise the next row is loaded, step 100, circularly shifted, step 102, and stored, step 104, until all of the rows of the 2D data block are completed.

Example 2D data block 200 in FIG. 2 illustrates the effect of a relative circular shift of one column between rows of the example data block. In this example, the top (i.e. first) row of example data block is unshifted (i.e. a total circular shift of zero columns), the next (i.e. second) row of the example data block is shifted one column total so that it begins with value (31) instead of value (16), the next (i.e. third) row of the example data block is shifted two columns total (or one relative to the preceding row) so that it begins with value (46) instead of value (32), and so on.

It should be noted that the data blocks stored using the example method of FIG. 1 may often be square (i.e. have the same number of rows as columns), such as example 2D data block 200 of FIG. 2.

Returning to the example method of FIG. 1, once a 2D block is completed, step 108, the data stored in each 2D data block is circularly shifted a predetermined number of rows relative to a preceding 2D data block in the sequence, step 110. The circularly shifted 2D data blocks are then stored in order, step 112. It is determined whether a predetermined number of 2D data blocks have been stored, step 114. If additional 2D blocks are determined to be needed to reach the predetermined number, the next 2D block is formed as described previously with regard to steps 100, 102, 104, 106, and 108, then the resulting 2D block is circularly shifted a predetermined number of rows relative to a preceding 2D data block in the sequence, step 110.

Once the predetermined number of circularly shifted 2D Blocks have been stored then the 3D data block is completed, step 116. In a number of applications it may be desirable for the 3D data block to be formed as a cube (i.e. having equal numbers of rows, columns, and layers); while in other applications it may be desirable for the number of layers to be uncorrelated to the number of rows or columns.

In one example, each 2D data block may represent data from a digital image of a video stream which are then stacked in temporal order so that the 3D data block represents a portion of the video stream with rows and columns representing spatial dimensions and layers representing the temporal dimension. Such a data block may allow for efficient calculation of functions within a single image and functions of a single pixel over a number of images (or of a series of pixels tracing an axis through the image over time, which may be useful in applications such as optical flow analysis).

One skilled in the art should understand that the example method of FIG. 1 may be extended to form similar example multi-dimensional data blocks having more than three dimensions. For example, an example four dimensional (4D) data block may be formed. In this example method, first 3D data blocks are formed according to the example method of FIG. 1. The data stored in each 3D data block is then circularly shifted a predetermined number of 2D blocks relative to a preceding 3D data block in the sequence. The circularly shifted 3D data blocks are then stored in order until a predetermined number of 3D data blocks have been stored, thereby forming the example 4D data block. In a number of applications it may be desirable for the 4D data block to be formed as a hypercube; while in other applications it may be desirable for the number of 3D blocks to be uncorrelated to the number of rows, columns, or 2D blocks.

Referring back to FIG. 2 (a schematic diagram illustrating storage of a sequential data in a two dimensional data block, using the example method of FIG. 1), the data used to form example data block 200 represents a 16×16 array of values, arranged sequentially by rows. FIG. 2 also illustrates a couple of examples of ways in which the data may be efficiently accessed from example 2D data block 200. In both of the following examples, the stored data is accessed such that one value from each memory macro (i.e. column) is accessed. Because the memory macros may desirably be accessed in parallel, the data in both of these examples may be accessed during a single clock cycle. As illustrated, the row of data accessed from each memory macro during the single clock cycle may be desirably controlled to recreate one of a number of different sets of values of the original array of values. For example, accessed data set 202 represents one column of data from a 16×4 partitioned matrix transpose of the original array of values, and accessed data set 204 represents one column of data from an 8×16 partitioned matrix transpose of the original array of values.

Although not shown explicitly in FIG. 2, one skilled in the art should understand that: a row of the original array of values may be accessed in a single clock cycle by controlling the row of data accessed from each memory macro so that each memory macro accesses a single row of example 2D data block 200; a column of the original array of values may be accessed in a single clock cycle by controlling the row of data accessed from each memory macro so that each memory macro accesses the row following the row accessed by the preceding memory macro of example 2D data block 200 (or the first row if the preceding memory macro accessed the last row); a wrapped diagonal of the original array of values may be accessed in a single clock cycle by controlling the row of data accessed from each memory macro so that each memory macro accesses a row separated from the row accessed by the preceding memory macro of example 2D data block 200 by a predetermined number of rows (wrapping to the top of the rows if this separation overshoots the last row); etc.

It should be noted that the sequence of data accessed in this manner may need to be swizzled (circularly unshifted) to properly reorder the data set accessed by the memory macros. For example, to access the second column of the original array of data, the value accessed by the memory macros, {241, 1, 17, 33, 49, 65, 81, 97, 113, 129, 145, 161, 177, 193, 209, 225}, must be swizzled one position to the left to recreate the second column of the original array.

Figure 3:
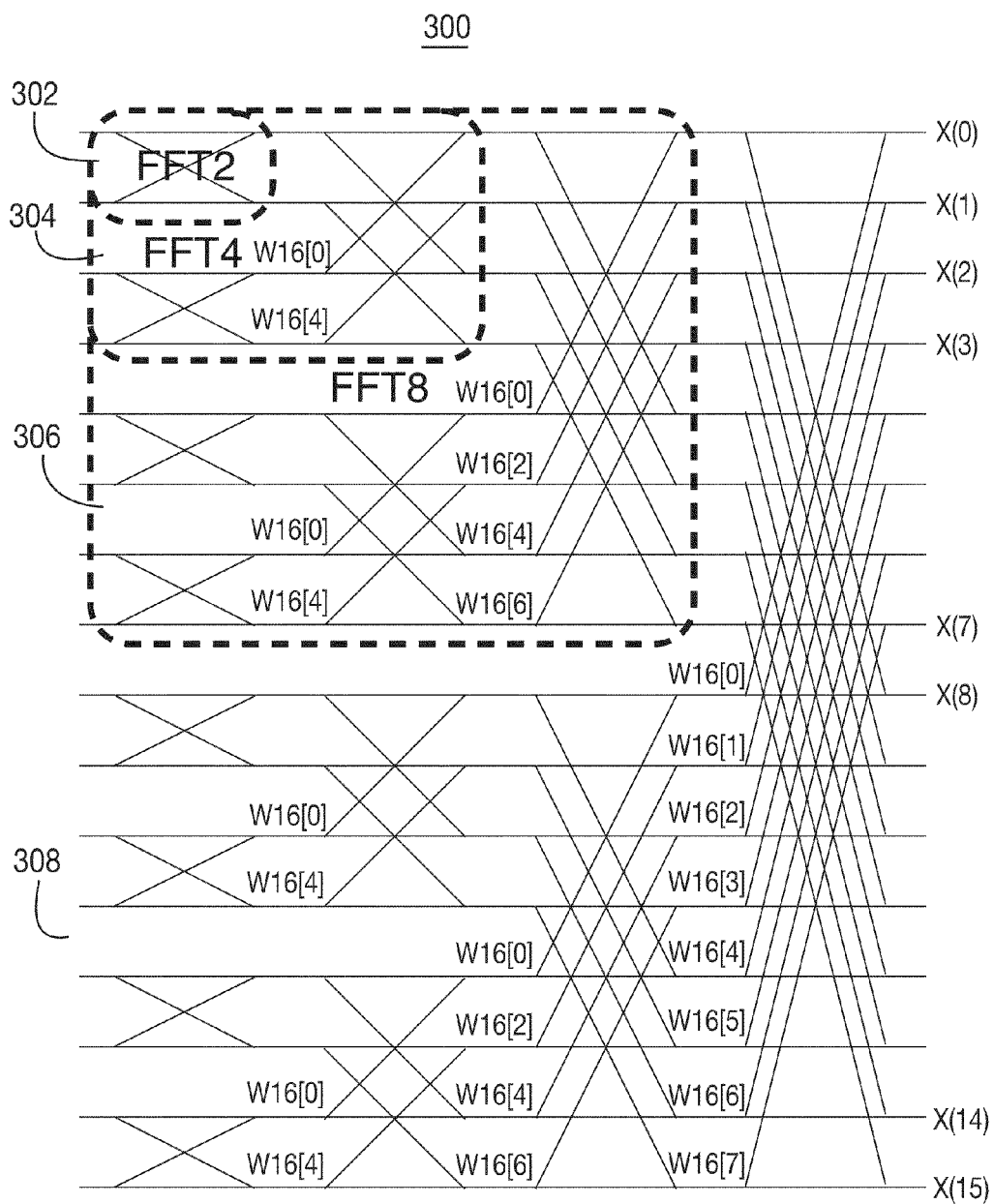
FIG. 3 is a schematic diagram illustrating an example 'butterfly' diagram for a 16-point fast Fourier transform (FFT) partitioning of a 16×16 array of data.

FIG. 3 illustrates example 'butterfly' diagram 300 for a 16-point fast Fourier transform (FFT) partitioning of a 16×16 array of data. The example data storage method of FIG. 1 may desirably allow for the efficient access of the desired portions of this 16×16 array of data needed for calculating 2-point FFT 302, 4-point FFT 304, 8-point FFT 306, and 16-point FFT 308.

Figure 4:
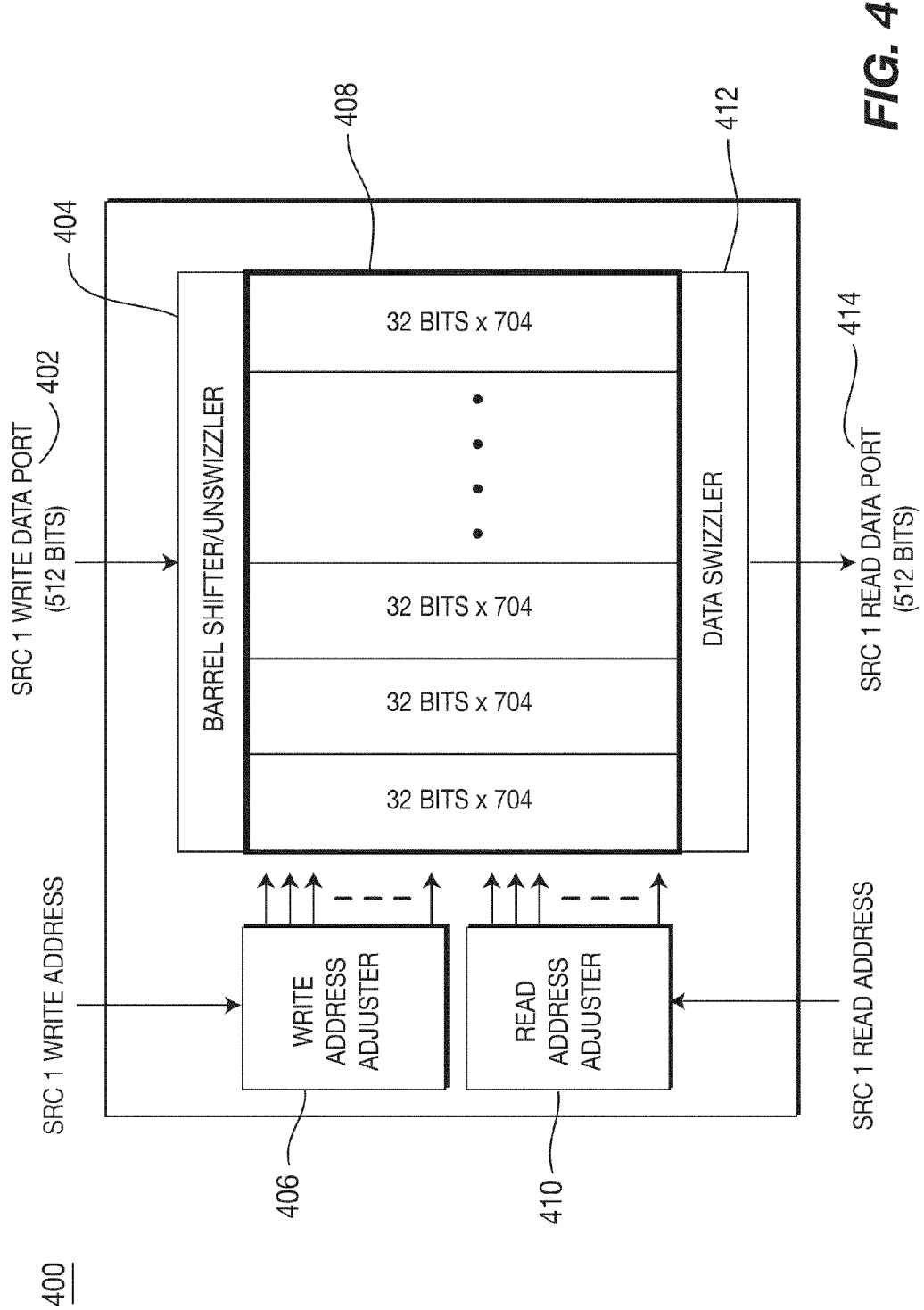
FIG. 4 is a schematic block diagram illustrating an example memory storage device for storing data in a block to provide improved accessibility of the stored data in two or more dimensions.

FIG. 4 is a schematic block diagram of example memory storage device 400 that may be used for storing data in a block to provide improved accessibility of the stored data in two or more dimensions, according to the example methods of FIG. 1. Example memory storage device 400 includes: write data port 402; input buffer and barrel shifter 404 coupled to write data port 402; write address controller 406; storage elements 408 coupled to barrel shifter 404 and write address controller 406; read address controller 410 coupled to storage elements 408; output buffer and data swizzler 412 coupled to storage elements 408; and read data port 414 coupled to output buffer and data swizzler 412.

Write data port 402 is desirably configured to allow parallel loading of a predetermined number of values, representing a row of data, into input buffer and barrel shifter 404. The input buffer of input buffer and barrel shifter 404 includes a number of memory macros equal to this predetermined number of values, which constitute a row of the block. The input buffer and write data port 402 are arranged such that sequential values in the data are loaded into sequential memory macros. Each of these memory macros desirably has a predetermined number of bits, e.g. 32 bits.

Input buffer and barrel shifter 404 may desirably include a power of two memory macros, such as 16 or 64, as described above with reference to the example method of FIG. 1. Each of these memory macros represents one column of the data block.

The barrel shifter of input buffer and barrel shifter 404 is coupled to the input buffer to circularly shift the data stored in the input buffer a predetermined number of columns relative to a preceding row of data (e.g., one column in the example data block of FIG. 2).

Write address controller 406 controls the storage of the circularly shifted rows of data from the input buffer and barrel shifter 404 into the plurality of storage elements 408. The number of storage elements 408 matches the number of memory macros in the input buffer of input buffer and barrel shifter 404, so that each storage element 408 corresponds to one column of the 2D data block. Each storage element 408 has a plurality of memory addresses, each memory address for storing one value of the data. Write address controller 406 desirably controls storage into storage elements 408, so that sequential memory addresses within each storage element represent sequential rows of the 2D data block, as illustrated in example 2D data block 200 of FIG. 2.

Storage elements 408 are desirably random accesses memory (RAM) elements.

As noted above with reference to FIG. 1, data to be stored by example memory storage device 200 may often represent a square array of values, arranged sequentially by rows. Thus, the memory macros, storage elements 408, and rows of each data block may be the same. Each storage element desirably has at least as many memory addresses as rows in the largest expected data block. Often the minimum number of memory addresses in each storage element 408 may be a multiple of the expected number of rows in a data block, thus allowing multiple data blocks to be simultaneously stored in example memory storage device 400.

Example memory storage device 400 also includes output buffer and data swizzler 412. The output buffer is coupled to storage elements 408 for accessing the stored data such that one value from each storage element may be accessed during a single clock cycle.

Read address controller 410 controls the memory addresses from each storage element 408 accessed by the output buffer during a clock cycle. This allows different axes of the array of data stored in the data block to be efficiently accessed, as described above with reference to the example methods of FIG. 1.

The data swizzler of output buffer and data swizzler 412 circularly shifts (or swizzles) the data in the output buffer accessed during the clock cycle to place the accessed data in the desired order. As described above with reference to the example methods of FIG. 1, read address controller 410 and the data swizzler allow the efficient reading of various axes within the array of values stored in the data block, such as rows, columns, wrapped diagonals, and columns of partitioned matrix transposes of the array of values.

Figure 5:
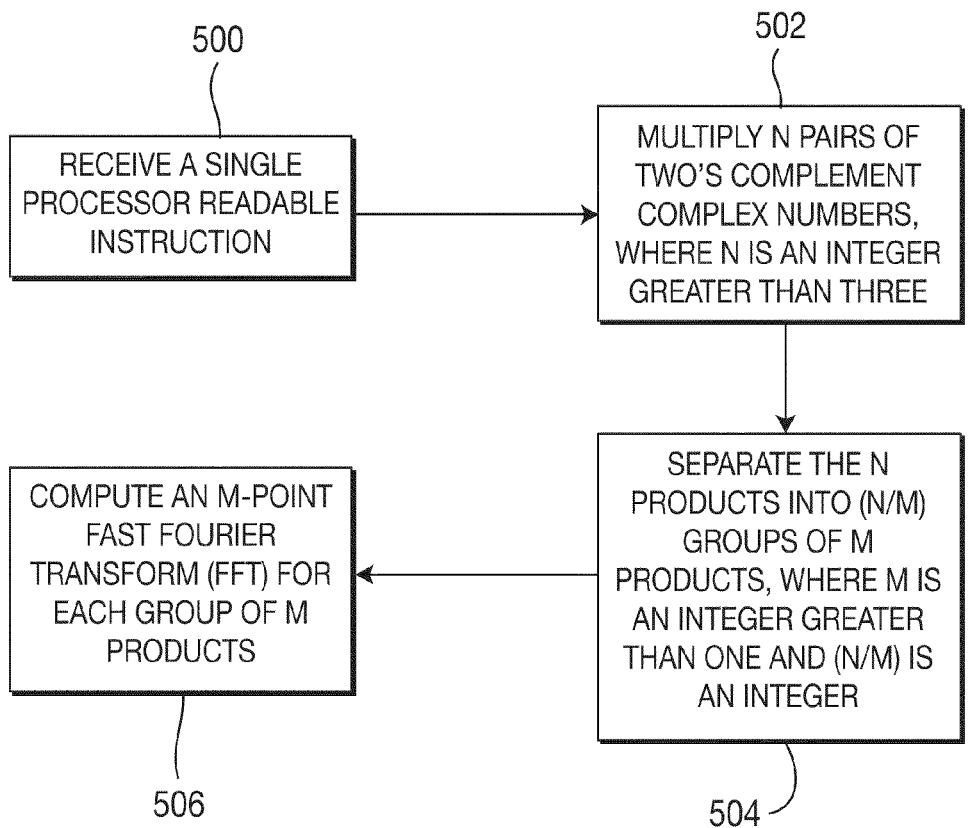
FIG. 5 is a flow diagram illustrating an example method for processing a single processor readable instruction in a single instruction multiple data (SIMD) processor.

FIG. 5 is a flow diagram illustrating an example method for processing a single processor readable instruction in a single instruction multiple data (SIMD) processor. This example method allows for the combined calculations of performing a complex multiplication of two series of two's complement complex numbers, followed by performing an FFT on the series of resulting products.

According to the example method of FIG. 5, a single processor readable instruction is received, step 500. In response to this single processor readable instruction the SIMD performs three operations: step 502, multiplying pairs of two's complement complex numbers from the two series; step 504, separating the resulting products into one or more groups of products; and step 506, computing an FFT for each group of products.

Each of the series of two's complement complex numbers includes a predetermined number of elements, identified as N for convenience (where N is an integer greater than three). Typically in many applications N may be a power of two, for example 16. The N pairs of two's complement complex numbers may desirably be stored in processor readable memory locations which are identified by first and second operands of the single processor readable instruction. Each of the two's complement complex numbers has a predetermined number of bits, for example they may be 16-bit two's complement complex numbers.

Performing a complex multiplication of the elements of these series results in a series on the products having N elements, step 502. These N products are then separated into (N/M) equally sized groups of M elements, where M is an integer greater than one and (N/M) is an integer, step 504. Each group includes a set of sequential products. It should be noted that the number of groups into which the series of products is separated include one group.

An M-point FFT is performed on each of the groups of M products, step 506, to complete the operation of the SIMD in response to the single processor readable instruction. In the example of 16 elements series of two's complement complex numbers, the possible values for M are 2, 4, 8, or 16, where M=2 results in the calculation of eight 2-point FFTs, M=4 results in the calculation of four 4-point FFTs, M=8 results in the calculation of two 8-point FFTs, and M=16 results in the calculation of one 16-point FFT.

It should be noted that the size of the original series, N, and/or the size of the groups to be separated, M, may constitute two additional operands of the single processor readable instruction.

Figure 6:
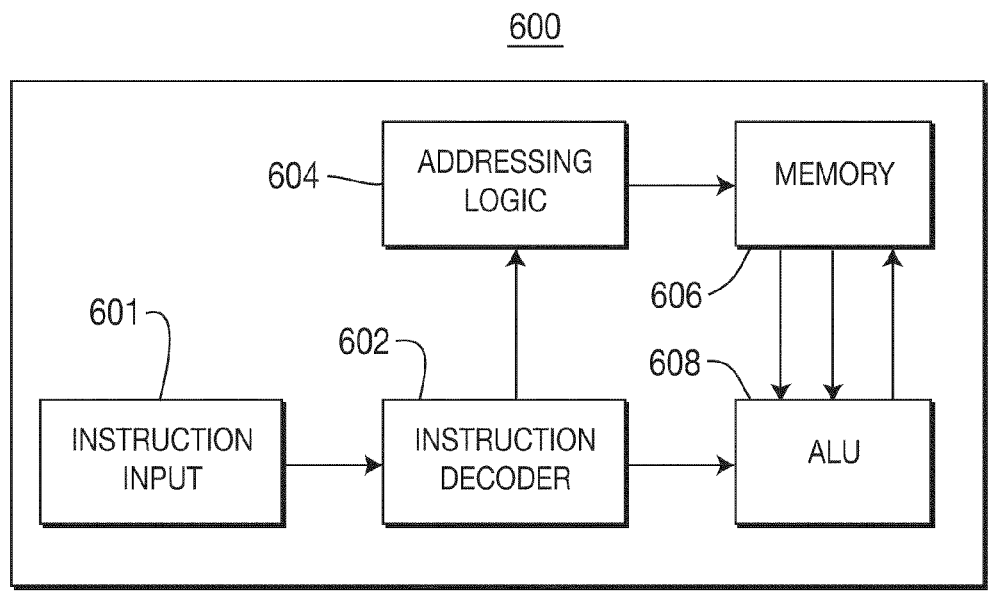
FIG. 6 is a schematic block diagram illustrating an example single instruction multiple data (SIMD) processor for performing complex multiplication and FFT processing of two series of two's complement complex numbers.

FIG. 6 is a schematic block diagram illustrating example SIMD processor 600 adapted to perform complex multiplication and FFT processing of two series of two's complement complex numbers. Example SIMD processor 600 includes arithmetic and logic unit ("ALU") 608, which is in communication with a plurality of registers (not specifically illustrated); instruction decoder 602; and memory 606. Instruction decoder 602 is further in communication with instruction input interface 601 and addressing logic 604.

Processor readable instructions are stored within instruction decoder 602. The results of calculations performed by SIMD processor 600 may be stored in memory 606 in communication with addressing logic 604. Memory 606 may be any combination of addressable storage elements including processor registers and memory, addressable by individual locations. In the example embodiment of FIG. 6, memory 606 forms part of SIMD processor 600. One of ordinary skill in the art should understand that memory 606 may be any suitable combination of memory and registers local to processor or computer readable memory external to the SIMD processor. Addressing logic 604, based on instructions as decoded by instruction decoder 602 controls which elements within memory 606 are processed.

SIMD processor 600 fetches instructions to be executed from instruction input 601. These instructions are decoded by instruction decoder 602. Arithmetic or logical instructions within decoded processor instructions are provided to ALU 608 which, in turn, operates on one or more operands in memory 606, in accordance with a decoded instruction to generate a result.

The contents of selected operands are provided from memory 606. Data from ALU 608 may be written to memory 606. Conveniently, in example SIMD processor 600, two data elements from two read addresses may be read concurrently on the two illustrated read lines from Memory 606 to ALU 608.

The source and destination addresses of operands and results for a particular instruction executed by SIMD processor 600 are typically specified as part of the instruction controlling the processor's operation. Generally, one or two read data memory addresses and one write data address specify locations of operands and results, and may form part of a provided instruction. These may be decoded by instruction decoder 602. Alternatively, read and write addresses may be provided indirectly based on values within registers of SIMD processor 600 as, for example, detailed in U.S. patent application Ser. No. 10/929,992, filed Aug. 30, 2004 naming Selvaggi et al. as inventors and entitled SIMD PROCESSOR AND ADDRESSING METHOD, the contents of which are hereby incorporated by reference.

ALU 608 desirably includes multiple parallel logic blocks for performing the same arithmetic or logical instruction on multiple data elements. As a result SIMD processors, generally, (and in particular, example SIMD processor 600 of FIG. 6) are particularly well suited for certain classes of arithmetic or logical calculations.

For example, SIMD processor 600 of FIG. 6 may be adapted such that ALU 608 may receive pairs of two's complement complex numbers from memory 606, where N is an integer greater than three. ALU 608 may desirably include N multipliers, a register coupled to the N multipliers and an FFT engine coupled to the register.

Each multiplier may desirably multiply one of the pairs of two's complement complex numbers in response to the single processor executable instruction received from instruction decoder 602. The N products of the N multipliers may be stored in the register. And the FFT engine may then perform an FFT on the N products stored in the register, also in response to the single processor executable instruction.

It should be noted that the FFT engine may further be configured to separate the N products into (N/M) groups of M products in response to the single processor executable instruction, where M is an integer greater than one and (N/M) is an integer. And perform an M-point FFT on the M products in each group in response to the single processor executable instruction.

Suitable processors that may be used in various example embodiments of the present invention may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

It is further noted that the various processors described herein may be embodied in separate elements. Alternatively, it is contemplated that two or more of these example processors may coexist within a single processor element.

Additionally, it is contemplated that the methods previously described may be carried out within a general purpose computer system instructed to perform these functions by means of a computer-readable medium. Such computer-readable media include; integrated circuits, magnetic and optical storage media.

Although the features and elements are described in particular combinations, each feature or element may be used alone without the other features and elements or in various combinations with or without other features and elements.

What is claimed is:

1. A method for storing data in a block to provide improved accessibility of the stored data in three or more dimensions, the method comprising the steps of:
   a) loading the data into a plurality of memory macros constituting a row of the block such that sequential values in the data are loaded into sequential memory macros, each memory macro is a predetermined number of bits wide;
   b) circularly shifting the data loaded in the row a predetermined number of columns relative to a preceding row, each column being one memory macro wide;
   c) storing the circularly shifted row of data;
   d) repeating steps (a), (b), and (c) until a predetermined number of rows of data are stored, thereby forming a two dimensional (2D) data block;
   e) circularly shifting the data stored in the 2D data block a predetermined number of rows relative to a preceding 2D data block;
   f) storing the circularly shifted 2D data block; and
   g) repeating steps (a), (b), (c), (d), (e), and (f) until a predetermined number of 2D data blocks are stored, thereby forming a three dimensional (3D) data block.

2. A method according to claim 1, wherein each row of data in the block is loaded in a single clock cycle.

3. A method according to claim 1, wherein each row of data in the block is constituted of $2^N$ memory macros, where N is a positive integer.

4. A method according to claim 3, wherein each block includes $2^N$ rows of data.

5. A method according to claim 4, wherein each block includes $2^N$ 2D blocks of data.

6. A method according to claim 1, wherein each memory macro is $2^N$ bits wide, where N is a positive integer.

7. A method according to claim 1, wherein:
   each row of data in the block is constituted of 16 memory macros;
   each memory macro is 32 bits wide; and
   each value of the data is a complex s16 value.

8. A method according to claim 1, wherein:
   the predetermined number of columns which the data loaded in the row is circularly shifted relative to the preceding row in step (b) is one column.

9. A method according to claim 1, further comprising:
   h) circularly shifting the data stored in the 3D data block a predetermined number of 2D blocks relative to a preceding 3D data block;
   i) storing the circularly shifted 3D data block; and
   j) repeating steps (a), (b), (c), (d), (e), (f), (g), (h), and (i) until a predetermined number of 3D data blocks are stored, thereby forming a four dimensional (4D) data block.

10. A method according to claim 9, wherein:
    each row of data in the block is constituted of $2^N$ memory macros, where N is a positive integer;
    each block includes $2^N$ rows of data;
    each block includes $2^N$ 2D data blocks; and
    each block includes $2^N$ 3D data blocks.

11. A method according to claim 1, wherein:
    the unstored data represents an N×N×N array of values, arranged sequentially by rows and 2D blocks, where N is a positive integer;
    each row of data in the block is constituted of N memory macros;
    each 2D block includes N rows of data; and
    each 3D block includes N 2D blocks of data.

12. A method according to claim 11, further comprising:
    h) accessing the stored data such that one value from each memory macro is accessed during a single clock cycle; and
    i) controlling the row of data accessed from each memory macro during the single clock cycle to recreate one of:
       a row of the N×N×N array of values;
       a column of the N×N×N array of values;
       a vector normal to planes of the N×N×N array of values;
       a vector of a partitioned matrix transpose of the N×N×N array of values; or
       a wrapped diagonal of the N×N×N array of values.

13. A non-transitory computer readable medium adapted to instruct a general purpose computer to store data in a block to provide improved accessibility of the stored data in three or more dimensions, the non-transitory computer readable medium having stored computer executable program code for performing a method comprising the steps of:
    a) loading the data into a plurality of memory macros constituting a row of the block such that sequential values in the data are loaded into sequential memory macros, each memory macro is a predetermined number of bits wide;
    b) circularly shifting the data loaded in the row a predetermined number of columns relative to a preceding row, each column being one memory macro wide;
    c) storing the circularly shifted row of data;
    d) repeating steps (a), (b), and (c) until a predetermined number of rows of data are stored, thereby forming a two dimensional (2D) data block;

e) circularly shifting the data stored in the 2D data block a predetermined number of rows relative to a preceding 2D data block;
f) storing the circularly shifted 2D data block; and
g) repeating steps (a), (b), (c), (d), (e), and (f) until a predetermined number of 2D data blocks are stored, thereby forming a three dimensional (3D) data block.

* * * * *